United States Patent [19]
Haruvy et al.

[11] Patent Number: 5,357,015
[45] Date of Patent: Oct. 18, 1994

[54] ELECTRIC FIELD CURING OF POLYMERS

[75] Inventors: Yair Haruvy, Rehovot, Israel; Stephen E. Webber, Austin, Tex.

[73] Assignee: Board of Regents, The University of Texas, Austin, Tex.

[21] Appl. No.: 28,786

[22] Filed: Mar. 10, 1993

Related U.S. Application Data

[63] Continuation-in-part of Ser. No. 707,140, May 29, 1991, Pat. No. 5,272,240.

[51] Int. Cl.$^5$ .............................................. C08G 77/06
[52] U.S. Cl. ........................................ 528/10; 528/12; 528/28; 427/489
[58] Field of Search .................... 427/489; 528/10, 12, 528/28

[56] References Cited

U.S. PATENT DOCUMENTS

| | | | |
|---|---|---|---|
| 4,085,248 | 4/1978 | Zehender et al. | 428/336 |
| 4,238,590 | 12/1980 | Scholze et al. | 528/5 |
| 4,429,024 | 1/1984 | Ueno et al. | 428/694 |
| 4,478,873 | 10/1984 | Masso et al. | 427/40 |
| 4,492,733 | 1/1985 | Phillips et al. | 428/412 |
| 4,539,232 | 9/1985 | Burzynski et al. | 427/387 |
| 4,604,443 | 8/1986 | Chang et al. | 528/28 |
| 4,754,012 | 6/1988 | Yoldas et al. | 528/10 |
| 5,008,219 | 4/1991 | Hara | 501/12 |
| 5,045,592 | 9/1991 | Weiss et al. | 524/755 |

FOREIGN PATENT DOCUMENTS

| | | | |
|---|---|---|---|
| 0310308A2 | 9/1988 | European Pat. Off. | C09K 11/08 |
| WO91/18933 | 12/1991 | PCT Int'l Appl. | C08F 8/42 |

OTHER PUBLICATIONS

D. Avnir et al., "Alcohol is an Unnecessary Additive in the Silicon Alkoxide Sol–Gel Process," *J. of Non-Crys. Solids* 192 (1987) 180–182.

CA Abstract 59509j, "Light-Conducting Systems," 74–*Radiation Chem., Photochem.*, vol. 67 (1967) 5591.

Sakka, "Formation of Glass and Amorphous Oxide Fibers From Solution," *Mat. Res. Soc. Symp. Proc.* vol. 32 (1984) 91–99.

Dislich, "Thin Films from the Sol–Gel Process," *Sol–Gel Technology*, 50–79.

Kaufman et al., "Structural Changes along the Sol–Gel–Xerogel Transition in Silica As Probed by Pyrene Excited-State Emission," *Langmuir*, vol. 2, No. 6 (1986) 717–722.

Zhang et al., "Synthesis and Characterization of Silicon Oxycarbide Glasses," *J. Am. Ceram. Soc.*, 73[4](1990) 958–63.

Haruvy et al., Abstract, "Poling and Chemical-Binding of Glass-Embodied Chromophores in Supported Sol–Gel Thin-Film Glasses for Second Harmonic".

Haruvy et al., "Poling and Chemical-Binding of Glass-Embodied Chromophores in Supported Sol-Gel Thin-Film Glasses for Second Harmonic Generation".

(List continued on next page.)

*Primary Examiner*—John C. Bleutge
*Assistant Examiner*—Margaret W. Glass
*Attorney, Agent, or Firm*—Arnold, White & Durkee

[57] ABSTRACT

The present invention relates to methods of accelerated curing of condensation polymers or inducing cross-linking of polymers by a direct current corona or glow discharge applied to the polymer bulk. The methods permit low temperature removal of volatile components from a material without inducing a chemical reaction or local heating. These methods have been employed to prepare fracture-free polysiloxane films up to 100 $\mu$m in thickness with curing time reduced by several orders of magnitude. A variety of metal ions, non-linear optical molecules or laser dyes may be incorporated in the films. The surface hydrophilicity of films may also be modified by this treatment. Additionally, an electrically conductive surface layer has been produced by incorporation of an appropriate dopant. Multilayered optical waveguide or lasing structures may be produced by this technique by successive deposition of spun films and curing.

12 Claims, 7 Drawing Sheets

ELECTRIC FIELD CURING OF POLYMERS

This application is a continuation-in-part application of U.S. Ser. No. 07/707,140, filed May 29, 1991, now U.S. Pat. No. 5,272,240.

BACKGROUND OF THE INVENTION

1. Field of the Invention

The invention relates generally to methods of accelerated curing of condensation polymers or crosslinking of polymers by a direct current glow discharge formed over the polymer bulk. The invention includes methods of forming hydrophilic surfaces, conductive layers on polymer surfaces and rapid, low temperature removal of solvent from a polymerizing matrix. The invention provides an efficient method of crosslinking and drying polymeric compositions.

2. Description of Related Art

Sol-gel techniques have been extensively investigated for more than two decades (Gottardi, 1982) and used to prepare glasses and ceramics for use in a wide variety of applications, employing various precursors, catalysts, additives and procedures.

Following the partial or complete hydrolysis of the silicon-alkoxide precursor, polycondensation of the hydroxyl groups takes place via the Si—O—Si etheric bonds. The glassy matrix formed by this polymerization is capable of encaging large molecules (e.g. chromophores, enzymes) which have been introduced into the reaction mixture. However, during this stage of the sol-gel synthesis severe cracking and fragmentation of the formed glass are the common obstacles that impede the fabrication of articles and films in general, and supported films in particular. This is due to the extensive volume-contraction which accompanies the condensation reactions and the corresponding expulsion of the condensation reactions and the corresponding expulsion of the solvent and the condensation products. Many investigators have attempted to overcome this obstacle by using a wide variety of additives such as dimethylformamide (DMF), formamide, organic acids or surfactants. Even with these additives, however, an extremely slow and very cautious drying of the sol-gel glass is necessary for the survival of a fracture-free glass, making this synthetic route more of an art than a science.

Although crack-free glasses from sol-gels have been prepared, the procedures are time-consuming and often complex. Of particular concern from a practical aspect is the undue amount of time required in curing glass thin-films on supported matrices. It is not unusual to dry polysiloxane films for periods of weeks to assure a quality glass. Such films, depending on conditions of drying, additives and process modifications have required from 6 to 45 days for complete drying to crack-free films (Hara, 1991).

Methods of curing polymers typically have involved the use of heat, UV or ionizing radiation, or chemical modification methods. Surface treatment of plastic films, improving the wettability for example, has been performed employing alternating current (AC) corona discharge techniques. AC corona treatment also appears to lower heat-sealing temperatures for most polymers and is often used to improve adhesion on automotive top coats by transforming a nonpolar topcoat surface into a polar adhesively suitable substrate for structural bonding. Effects of AC corona discharge treatment can generally be erased, either by a heat treatment or by contact with a metallic surface. Upon prolonged storage, slow migration of low molecular weight nonpolar species to the film surface and/or migration of polar species from the surface into the bulk are believed to cause gradual decay of corona-induced wettability properties (Wu, 1982).

Electrolysis using direct current (DC) glow discharge has been reviewed (Hickling, 1971). The method consists of placing an electrode above the surface of a liquid, usually an aqueous electrolytic solution, and the other electrode inside the bulk liquid. At sufficiently high current voltage, an electrical discharge is initiated creating free radicals or ionic species at the solution surface. In general there is little or no specificity in the ensuing electrochemical reactions. Moreover, the solutions must be vigorously stirred in order to dissipate the heat generated in the reactions.

SUMMARY OF THE INVENTION

The present invention addresses one or more of the foregoing problems by providing methods of curing polymers using a direct current electric field. This method involves a corona or glow discharge induced field across the polymer bulk during the curing process. The inventors have discovered that this is a surprisingly rapid method of curing polymer films such as spin-cast polymethylsiloxane. Curing at room temperature has been accomplished in short periods, often as short as 10–20 min for polymethylsiloxane glasses. Thin films up to 100 micrometers have been rapidly cured by this process.

Glow discharge curing may be applied to virtually any condensation polymer or any polymer resulting from a condensation reaction in which crosslinking or completion of polymerization is required for curing. It is contemplated that appropriate polymers may include polyesters, phenol formaldehydes, melamine, formaldehydes or, in preferred practice, polyamic acid resins, polyoxysilanes or substituted polyoxysilanes such as polymethyl siloxane. Glow discharge curing is not limited to spun cast films but may be applied also to fibers or shaped articles. The method is especially useful for polymer films approximately 1–100 micrometers in thickness.

Glow discharge is preferably conducted by setting up an induced electric field over the polymer surface. Typical conditions are about 3–12 megavolts applied at a sharp tip approximately 1–5 cm above the polymer surface with a current of 10–20 microamps, although this may vary depending on the polymer. The inventors have discovered that the electric current through the polymers, typically 10–20 microamps across thin film polymers prepared from substituted siloxane monomers, is associated with this rapid curing procedure.

Glow-induced sol-gel curing may result in the formation of a hydrophilic surface on the polymer film. Without application of glow discharge, polymer or sol-gel films allowed to cure thermally usually become hydrophobic. Hydrophobic films typically are manifested by contact angles which are as large as those observed on paraffin film. Hydrophobicity may cause poor adhesion of successively cast films. Glow discharge cured films do not have large contact angles, thus indicating a fair degree of hydrophilicity. Hydrophilicity of films cured by glow discharge is controlled by the mole ratio of water in the reaction mixture, by the amount of condensate molecules removed by distillation before casting or by the current-voltage used for the curing.

Additionally, multilayered assemblies of hydrophilic sol-gel films may be prepared by glow discharge curing. Hydrophilic gel surfaces will stick together better than hydrophobic gel surfaces and are therefore useful for such applications as multilayer wave guides and surface lasers.

The present invention addresses one or more of the foregoing or other problems by providing a method of preparing glass films which can be made as single or multiple layer thin films with a range of thicknesses. Thin films polymerized from metal alkoxide monomers are free of cracks and generally may be prepared in a few hours by curing at elevated temperatures. Alternatively, curing of the polymer films may be accomplished in a period of minutes using a glow discharge technique during the curing process. Guest molecules, including laser dyes and donor-acceptor molecules, are readily incorporated into the glasses produced by methods in accordance with the invention.

In one aspect, the invention is generally directed to a method of rapid preparation of crack-free glasses. A suitable metal alkoxide monomer is selected, polymerized during a hydrolysis step and subsequently cured. The inventors have discovered that through use of various reaction conditions one can provide films having desirable optical and/or mechanical properties.

It will be appreciated that the hydrolysis and polymerization reactions are occurring at the same time within the solution although varying degrees of hydrolysis will precede certain stages of polymerization and crosslinking. In one embodiment of the invention, a substituted silane monomer in the presence of an appropriate amount of water is heated to a temperature of about 60°–90° C. A single phase is formed and after the formed alcohol has distilled off, a viscous solution is formed which is then cured. Curing is a process in which completion of crosslinking of the polymer within the gel occurs, adding to the rigidity and hardness of the gel. This commonly requires several hours to several days at room temperature depending on numerous factors such as thickness or MR. The time may be shortened considerably by curing, for example, at elevated temperatures.

Glow discharge curing of polymer films may be carried out at almost any desired temperature. For polysubstituted siloxane films, this is usually at room temperature, that is, about 20°–25° C. Lower temperatures may be used, and lower limits are constrained only by the mobility of the water or other condensate within the matrix. Thus in particular cases, extremely low temperatures, e.g., −50° C. may be used to cure articles formed to extremely accurate dimensions for intended use at this temperature, e.g., space use. In other cases, elevated temperatures may be preferred, for example, to accelerate curing rates or to prepare articles in accurate dimensions for use at elevated temperatures.

Curing of the hydrolyzed/polymerized metal alkoxide monomer may be carried out by allowing the polymerized solution to "air-cure" by standing at ambient or elevated temperature in an inert atmosphere, controlled humidity or at other than atmospheric pressure. By way of illustration, polymethylsiloxane gels are preferably cured at a temperature of about 60°–70° C. under normal atmospheric conditions.

The inventors have further demonstrated that this electric field curing (also referred to as "corona field curing" or "glow discharge curing") can induce crosslinking between different polymers or the same polymer by enhancing a condensation reaction.

In yet another aspect of the invention guest molecules are included in the polymer glass matrix. In particular, high concentrations of donor-acceptor molecules may be included in these matrices. Examples include compounds such as p-nitroaniline, 4,4'-diamino diphenyl sulfone, 4,4'-aminonitroazodiphenyl, or 4,4'-dimethylamino nitrostilbene. Guest molecules may also include laser dyes, such as Rhodamine-6G, Pyridin-1, or Coumarin-153. Where high concentrations of guest molecules within the matrix are desired, certain modifications of the sol-gel polymerization process have been found desirable. Thus, it is preferred to slow down evaporation of the alcohol, for example methanol arising from hydrolysis of methoxyl groups, in the sol-gel until sufficient molecular weight and viscosity have been obtained. This may be conveniently carried out by conducting the first 5 min of polymerization in a sealed vial, opening the vial and monitoring methanol loss until approximately 350 milligrams per gram of monomer is obtained. This compares with the regular process loss of 500 milligrams per gram of monomer. Limited loss of methanol with these types of guest molecules within the matrix has the effect of substantially reducing association of these molecules within the polymerization solution. Consequently the formation of solid crystallites and subsequently inhomogeneous film is prevented. Other methods of slowing down or counteracting fast evaporation of alcohol from the polymerization solution include adding less volatile solvents, miscible organic solvents such as ethanol, higher alcohols, acetonitrile, or the like, or water immiscible organic solvents such as toluene.

The invention also includes polymers produced by the aforementioned method of producing glass films. These are crack-free, optically clear polymers. These polymers are preferably polysiloxane or substituted polysiloxane polymers and will have hydrophobic or hydrophilic surfaces if air-dried or glow discharge cured respectively.

Films prepared by the aforedescribed methods, particularly polymethylsiloxane and polysiloxane films, are useful as optically clear glasses or may be used as waveguides, particularly multilayered assemblies, for example, by incorporating laser dyes into the monomer solutions used for polymer preparation of an internal layer. Many uses of the fracture-free films are envisioned, including incorporation of molecules that can be reversibly oriented by an applied electric field to produce a switchable non-linear optical device, optical waveguides, surface or amplification lasers produced by combining a waveguide structure with a laser dye incorporated in the appropriate layer, surface or amplification laser with sensitizing dye on top and bottom layers of waveguide structure and lasing dye in the center layer, waveguide structure with incorporated dye to capture light and convert it to fluorescent wavelength for edge sensitization of photovoltaic or photogalvanic cells, like the foregoing except applied to photoresistor or phototransistors; with incorporation of appropriate phosphors or dyes, optical readout of electron beam or other radiation such as applied to CRT technology or spatial detection of x-rays or equivalent radiation, modifications of PMSO or equivalent condensation polymer film surfaces by simultaneous glow discharge curing and electrochemical polymerization of appropriate incorporated electropolorizable monomers, including conducting polymers, cladding of fibers, surfaces of other articles (formed, molded, spherical), optical data storage or readout, fluorescent or optical absorption based display or ornamentation application, enhanced visualization of radioactivity with incorporation of appropriate phosphors or dyes, incorporation of biologically active species such as enzymes with or without absorption or emission of light.

DETAILED DESCRIPTION OF THE PREFERRED EMBODIMENTS

Figure 1:
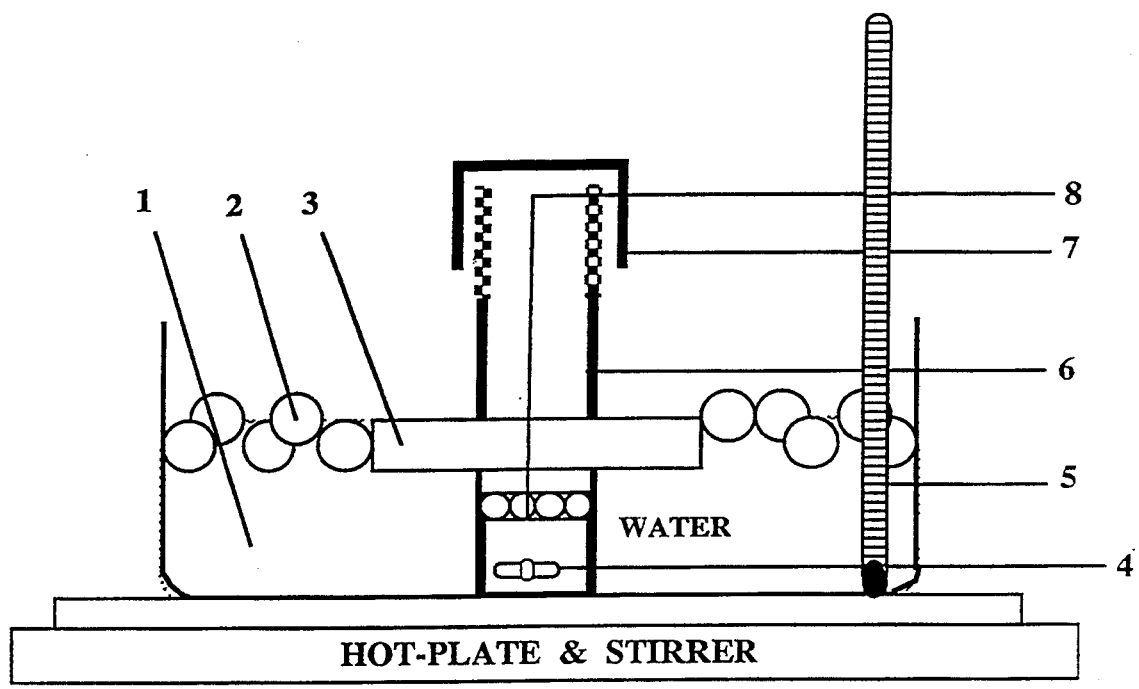
FIG. 1 shows a typical set-up for hydrolyzing and polymerizing metal alkoxy monomers used to prepare glasses and thin films. 1 is a water bath at constant temperature; 2 are hollow beads; 3 is a styrofoam bar; 4 is a magnetic stirring bar; 5 is a thermometer; 6 is a reactor (e.g., a 1 dram vial); 7 is a pressure regulator (e.g., a cup); and 8 is a viscosimeter (e.g., bubbles).

The present invention includes a rapid, single-step method of preparing what are commonly known as sol-gel glasses, supported films in particular. The invention is illustrated in detail with preparation of glasses prepared from alkoxysilane and alkylalkoxysilane monomers and indicates variations which allow flexibility in achieving desired polymer properties, depending on the application. Especially desirable are fracture or crack-free glasses that are rapidly prepared, some in a matter of minutes.

Although the method may be varied, the inventors have shown that preparation of crack-free glasses from methyl alkoxysilane monomers depends on the maintenance of a single phase during the hydrolysis/polymerization process. Thus the practitioner will usually mix a lower molar ratio of water to monomer, about 1.5:1, and then heat to about 80° C. This accelerates hydrolysis and polymerization, while assisting in maintaining a single phase reaction.

The method produces alcohol from hydrolysis of the alkoxide group. Methoxyl groups are used because methanol is produced which is easily removed, readily distilling off at the temperatures employed for the reaction. Removal of methanol maintains a low volume for the reaction, considered a factor in efficient polymerization. At 80° C., a viscous one-phase polymer solution suitable for casting or forming is obtained after about 5 min. At 70°–72° C., the same viscous solution is obtained after about 15 min.

The composition of a methyltrimethoxysilane-water mixture at a given reaction time is dependent on the temperature. At high temperatures a smaller fraction of the completely hydrolyzed species is present. This composition determines phase separation and the flexibility of the polymer formed, in turn leading to better quality cast films where curing takes place while the bulk polymer retains some flexibility.

As a general guideline, polymer solutions formed from methyltrialkoxysilane monomer are ready for casting into films after about 500 mg methanol per g of monomer has been removed from the solution. It is convenient to monitor methanol loss gravimetrically, although volumetric determinations or measurement of density changes in the solution would also be applicable.

Similar methods are applied in producing films from silane monomers. The hydride substituent of trialkoxysilane oxidizes so quickly when the monomer is mixed with water that certain precautions are taken to assure even polymerization and subsequent grainless, crack-free glasses after drying. Trimethoxysilane is mixed with water at a MR of about 0.95 under an inert atmosphere such as nitrogen, argon or helium. Any convenient nonoxidizing atmosphere could be used which will prevent excessively rapid oxidation of the hydride. The condensation reaction is quite rapid, usually less than one minute at room temperature for trimethoxysilane. The rate would likely be slowed somewhat at lower temperatures, although care should be taken to assure that the reaction mixture maintains a single phase.

Glasses are generally formed after hydrolysis/polymerization followed by a curing process. Curing entails several reactions, usually some further polymerization and formation of crosslinks as well as additional hydrolysis by water produced from condensation reactions. For many siloxane glasses, particularly films, formed from alkoxy or alkylalkoxy monomers, curing at room temperature or elevated temperatures will provide satisfactory crack-free films. The process is accelerated at the higher temperatures, and may require up to a few days at room temperature, depending on composition and thickness. Curing of polymethylsiloxane films at 70° C. takes about 2–3 hrs for films of 1–25 μm thickness. Thermal curing is commonly used, but other methods could be employed including curing under reduced or increased pressure and varied humidity.

Generally, polymers are best processed as linear or branched chains that are not interconnected and hence allow melt-processing (e.g., molding) or solution application such as coating. Products made of such polymers, denoted as thermoplastics are affected by heat and solvents. Also upon application of stress, these materials gradually flow and change dimensions, a phenomenon known as creep. Hence, for many it is desired to convert the thermoplastic polymer in its final shape into a thermosetting polymer by forming inter-chain chemical bonding. Such polymers can no longer undergo melting or dissolution and are free from creep.

Formation of interchain bonds in polymeric material (crosslinking) occurs during curing or drying. This process can be effected by heat-activated reactions, by UV or ionizing radiation or by chemical modifiers, each having drawbacks. The inventors have discovered that the disclosed methods involving glow discharge and which do not involve heat processing, will not impose dimensional changes or thermal stresses in cross-linked polymers. There is no health risk or hazard as is associated with ionizing or UV radiation. Additionally, the diffusion limitation encountered in chemical modification methods is not present.

Extremely rapid curing, often in minutes, is achieved with an electric field discharge method. This involves an intense direct current (DC) electric field across the polymer, the electric field being produced by a corona discharge. The method works for all types of condensation polymers. Polymethylsiloxane films are cured by casting over a rigid surface that will act as an electrode. A strong DC electric field is generated near the polymer without arcing. Normally, polymethylsiloxane polymers do not conduct current, but large fields applied to the bulk polymer generate currents on the order of 10 $\mu$mps. Applied to a 10 $\mu$m freshly cast polymethylsiloxane film, such a current completes the curing of the film in several minutes, contrasted with 2-3 hrs at 70° C. under normal atmospheric conditions. This method of glow discharge illustrates the principle of applying an electric field across the bulk polymer during polymerization. Ion migration generates the observed current which can be varied with the field applied to alter polymer surface properties such as hydrophilicity. Variations in field intensity, intermittent glow discharge or similar changes could be made.

Regardless of the forming procedures used prior to curing the polymer, fibers, films or shaped articles formed by the methods herein can be cured free of cracks or fractures. Films are particularly useful for many purposes, including optical use. Siloxane films are best hydrolyzed/polymerized at room temperature or below and generally would not be amenable to rapid curing by glow discharge. Siloxane films prepared by spin-casting polymerized trimethoxysilane are optically clear and virtually identical to $SiO_2$ glasses after curing and oxidation. While glow discharge may not be desirable for acceleration of curing in these films, it could be used to alter surface properties to enhance hydrophilicity. Thus multilayers of these films could be more easily fabricated with less "gliding".

Preparation of the Supports

Glass supports were coated with indium tin oxide (ITO) which was connected to the ground pole of a corona circuit.

Metallic supports were typically 1" disks of copper (sometimes gold-coated) or aluminum, polished and/or cleaned with organic solvent. In some cases aluminum disks could be briefly exposed to aqueous base (NaOH or KOH) to improve the adhesion of the polymer to the support.

Set-Up

The hydrolysis and polymerization were carried out using the experimental set-up schematically described in FIG. 1. The process "reactor" can be a disposable vial (1-4 drams) equipped with a screw-cap. Temperature control and the stirring of reactants were maintained by a water-bath/stirrer-hot-plate assembly and a magnetic bar in the reaction vial. As a safety precaution necessitated by the occasional splashing during vigorous reaction of the alkoxy monomers at elevated temperatures, the reactions were started with tightened screw-cap which was gradually released after ca. 240 s (cf. FIG. 1) to allow evaporation of volatile products.

Monitoring Polymerization and Casting

Figure 2:
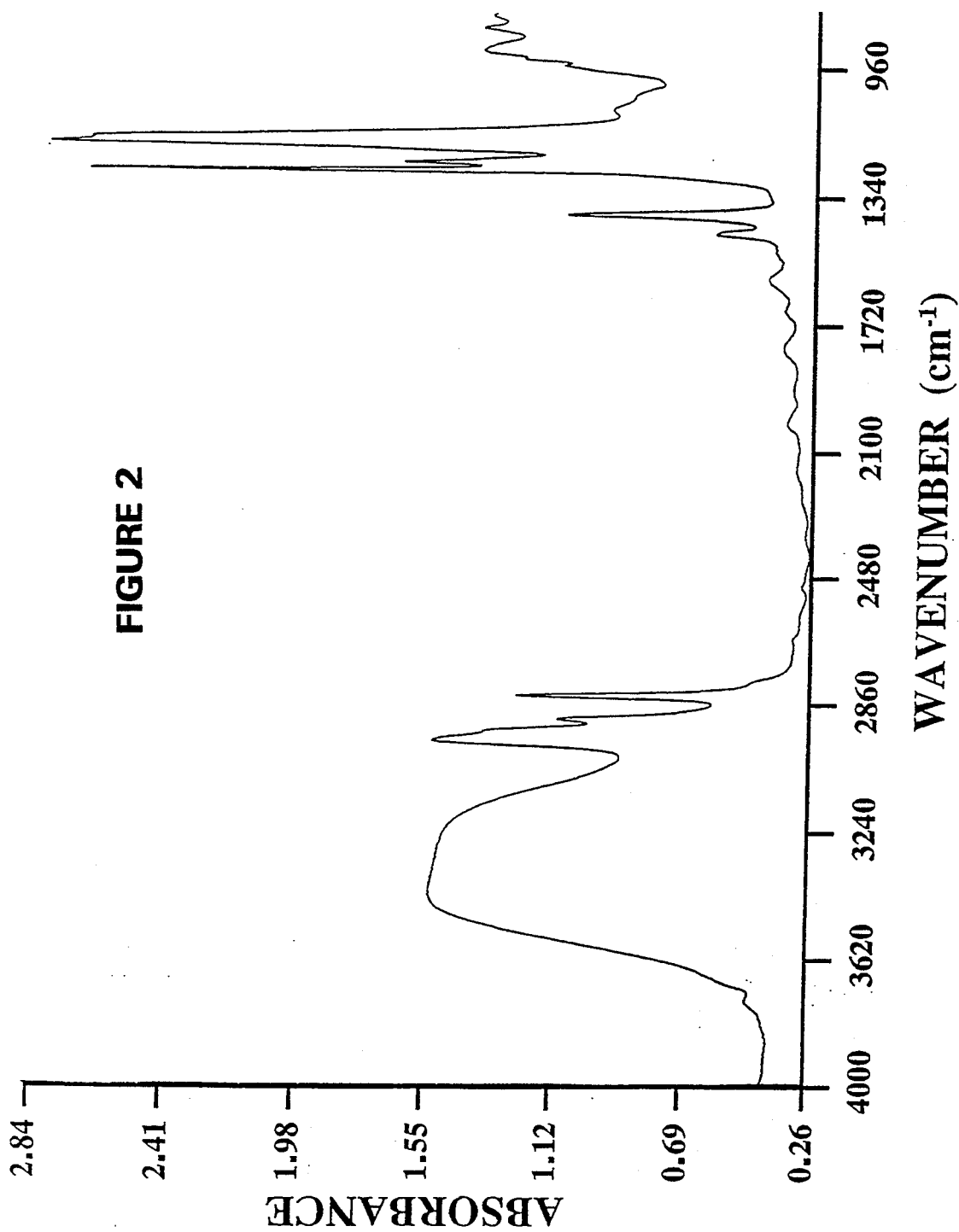
FIG. 2 is a FTIR spectrum of sol-gel (MTMS) prepared polymethylsiloxane thin-film on an aluminum support.

The progress of the hydrolysis reaction was monitored gravimetrically by recording the weight-loss of the reaction mixture following the distillation-out of the alcohol produced therefrom (see FIG. 2). The propagation of the condensation-polymerization was monitored by the size and the duration of the bubbles produced by the alcohol boiling out from the viscous polymerizing solution.

Films were spin-cast on the support using a spin-coater (Headway Research, Model 2-EC101-R485). The pretreated support was attached to the spinner chuck. At the appropriate stage of condensation, the polysiloxane viscous liquid was poured onto the support, sup-cast for 240 s at ca. 1000 RPM. The samples were left to cure until the surface was no longer sticky. Typical curing duration in the absence of a corona discharge was a few hours (at 60°-70° C.) or a few days (at room temperature, ~50% relative humidity). Alternatively, the film or substrate was placed in the apparatus illustrated in FIG. 4 and exposed to the corona or glow discharge.

Determination of Film Thickness

The thickness of the dry films incorporating chromophoric material was calculated from the measured absorbance of the dye in the glass, the extinction coefficient, the dye concentration and the density of the glass film (measured to be ca. 1.3 g/cm$^3$). Direct measurements were carried out with an Inverted-Stage Epifluorescent Video Microscope (Leitz Fluovert; Rockleigh, N.J.).

Spectroscopy

Spectral measurements of chromophore molecules were carried out either on supported glass thin-films embodying them or on solutions. Aluminum slabs were used as support for the films subjected to corona glow discharge. Ultraviolet-visible absorption spectra were recorded on HP-8481A Diode Array Spectrophotometer. Fluorescence spectra were recorded on a SPEX Fluorolog with a 450-W Xenon lamp and a TE-177-RF photomultiplier (Products for Research, Inc.).

EXAMPLE 1

Preparation of Polymethylsiloxane Glass Films

One g of methyltrimethoxysilane was heated to 80° C. with 0.2 g water containing 10$^{-2}$M HCl (monomer to water molar ratio of 1:1.5) in a vessel equipped with stirrer and temperature control, as shown in FIG. 1. Phase merging of the reactants occurred in less than 5 sec. The progress of the hydrolysis was monitored gravimetrically by recording the weight-loss of the reaction mixture as methanol produced by the reaction was distilled out of the solution. The methanol evaporation leveled off after about 5 min and the viscous mixture, having lost about 550 mg methanol, was spun cast onto a glass support precleaned as described under Materials and Methods. Spin-casting was performed as described under Polymerization and Casting, at 1000 rpm for 240 sec. The cast film was allowed to cure at 70° C. until the surface was no longer tacky, about 2-3 hr. Films were typically 10-25 $\mu$m but were obtainable up to 100 $\mu$m by tuning viscosity of the cast gel and/or the spinning rate during casting of the film.

The film was crack-free and optically clear with the exception of methyl group absorption in the 2800-3200 cm$^{-1}$ region of the spectrum. The FTIR spectrum is shown in FIG. 2.

Figure 3:
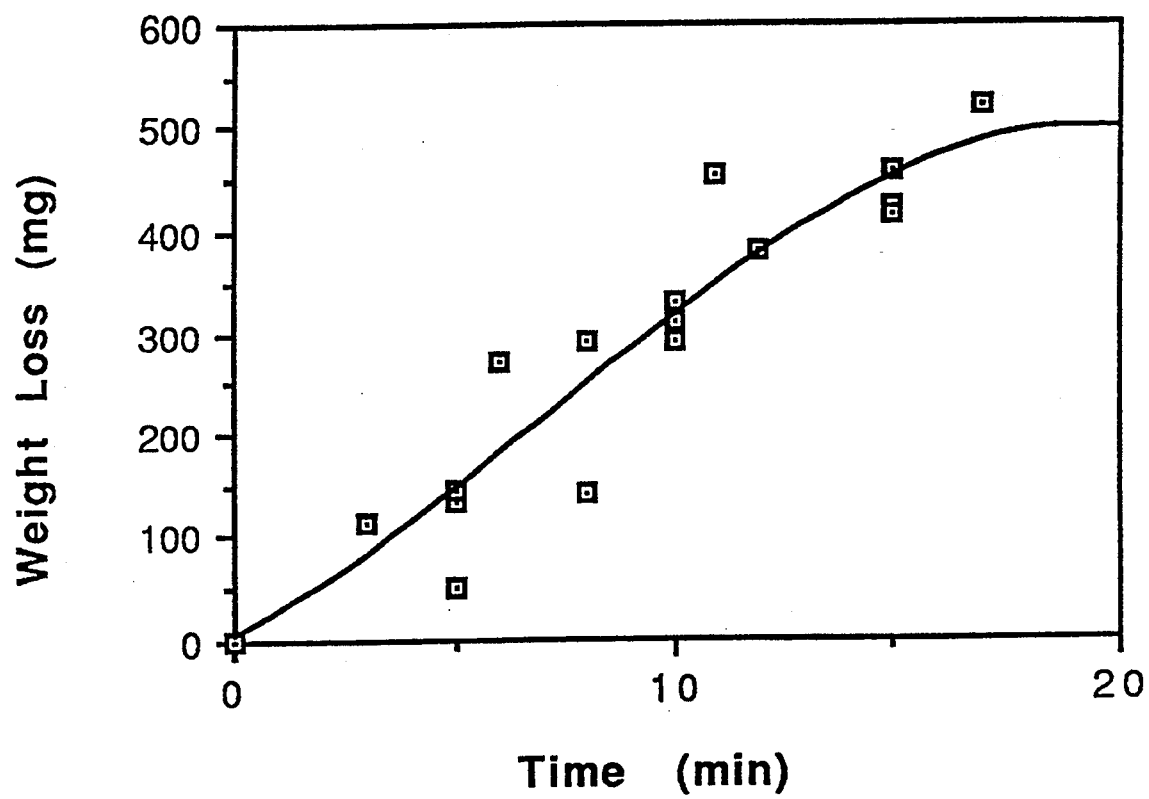
FIG. 3 shows weight loss from a MTMS gel due to evaporation of methanol at 70°–74° C.

FIG. 3 shows the time course of methanol loss during the hydrolysis/polymerization run at 70°-74° C. The weight loss of methanol levels off after about 20 min.

EXAMPLE 2

Electric Field Curing of Sol-Gel Films

Sol-gel films were prepared as described in Example 1 using methyltrimethoxysilane monomer except that the films were spin-cast onto a metal disk (either aluminum, copper or gold-coated copper) that had been polished or cleaned. Accelerated curing was induced by application of a high direct current voltage across the polymer bulk, using glow discharge from a high voltage electrode mounted above the polymer surface.

Figure 4:
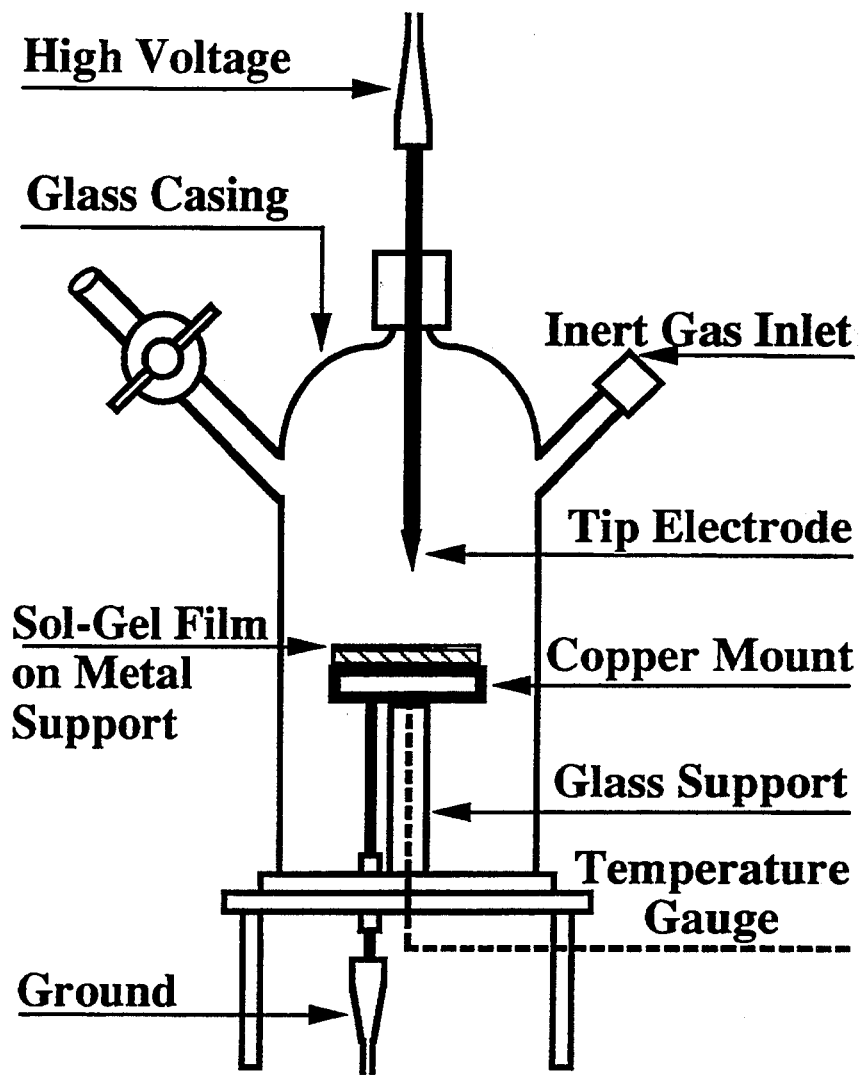
FIG. 4 is a schematic representation of the set-up used for glow discharge polymer films.
Figure 5:
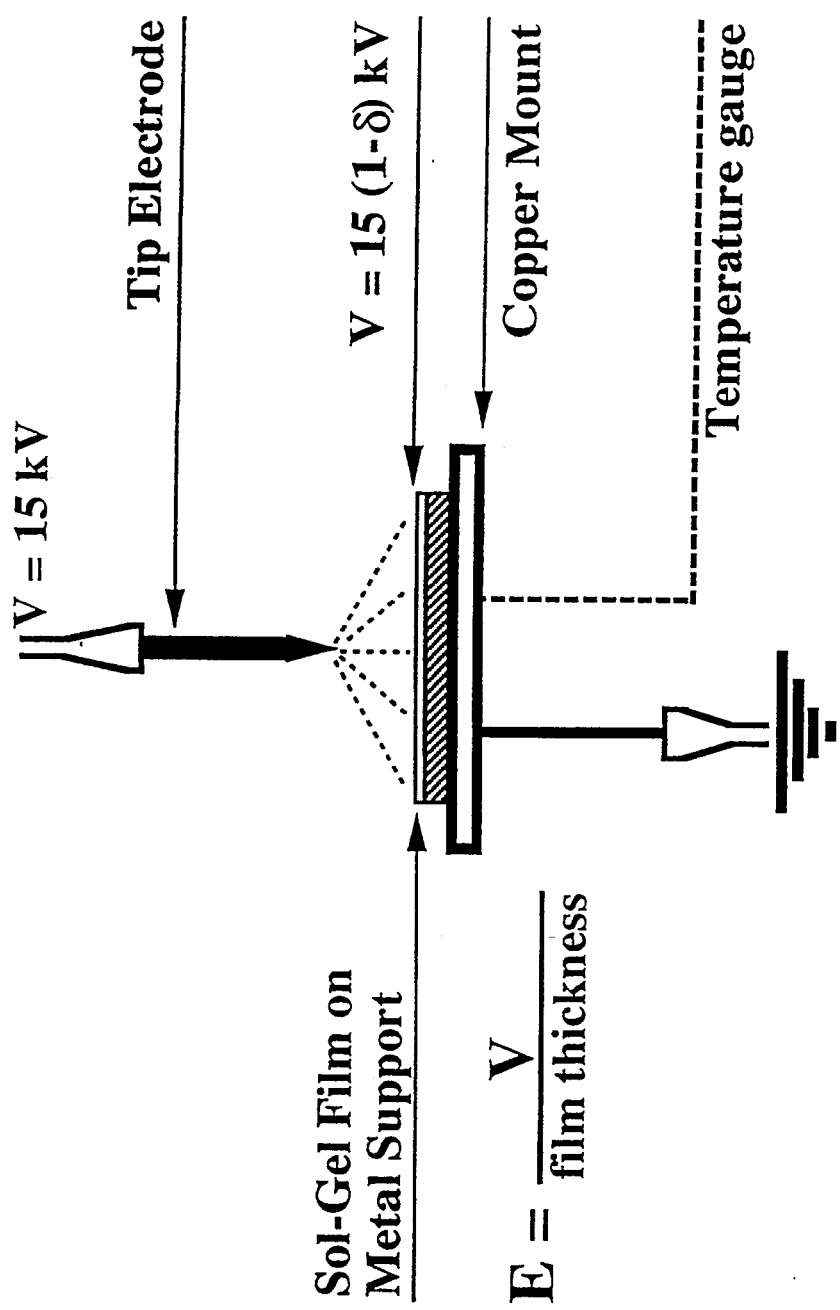
FIG. 5 illustrates the electric field formed across insulating films.
Figure 6:
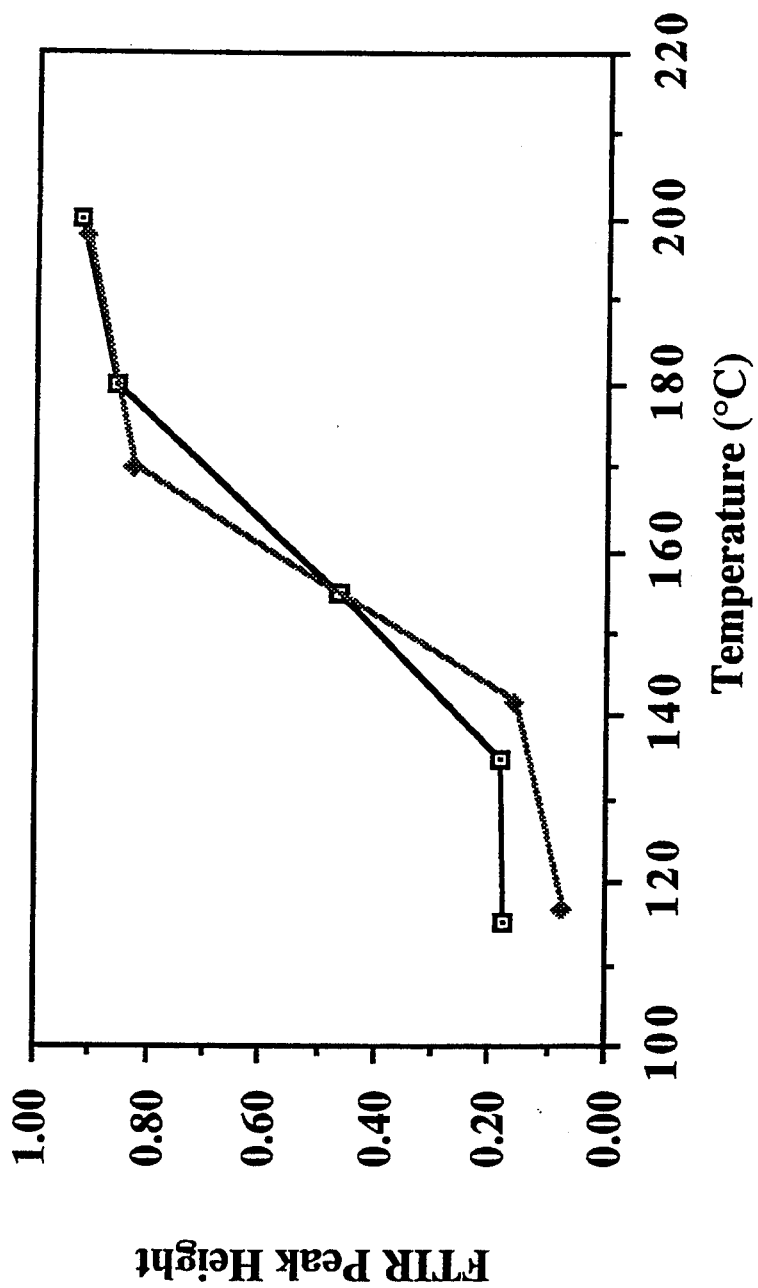
FIG. 6 is the 1780 cm$^{-1}$ FTIR band from spectra of poled and unpoled polyimide samples normalized to the 1500 cm$^{-1}$ phenyl peak as a function of temperature.

The set-up used for glow discharge curing of gels and gel-embodied molecules is shown in FIG. 4. The high voltage power supply used was a "DC High Voltage Insulation Tester" (Lanagan & Hoke, Inc.) capable of supplying up to 15 kV and 500 µA. A Glassman power supply was also employed for this purpose. Gel samples, freshly cast on a metallic support, FIG. 5, were placed on the lower flat electrode. The center tip-electrode was placed at a distance of 2 cm above the gel. The high voltage was applied gradually until reaching the maximum allowable value without producing arcing. The glow discharge was continued until the surface of the gel appeared cured, as manifested by loss of gloss.

Table 1 shows the results of glow discharge curing on polymethylsiloxane films prepared with various MR. Gel films were observed to dry and harden in exceptionally short periods of time. Less than 20 min was required for the water-rich recipes (water to siloxane molar-ratio, MR=2) while less than 90 min was required for stoichiometric recipes of MR=1.5. By comparison, curing at room temperature without glow discharge required from 8 to 96 hours. Thus the glow discharge accelerated the curing by a factor of 24 to 64 in this case.

TABLE 1

Curing Time and Surface Properties of Glow Discharge Cured Sol-Gel Films

| $H_2O$/MTMS Molar Ratio (a) | Voltage-Current-Time Glow Discharge Curing Sequence (kV-µA-min) (b) | Curing Time (min)$^a$ | Contract Angle (aver:deg) |
|---|---|---|---|
| 2.25 | 10-12-2; 12-12.5-2; 13-15-2; 14-18-2; 14.5-15-4; 15-18-8 | <20 (<16 h) | 61 ± 5 (79 ± 2) |
| 2.0 | 10-2-1; 12-2-1; 13-3-1; 14-4-2; 14.5-8-2; 15-8-13 | 20 (~16 h) | 71 ± .4 (78 ± 1) |
| 1.8 | 10-1-0.5; 12-3-1; 13-4-1.5; 13.5-6-4; 14-10-4; 14.5-9-2; 15-12-7 | 20 | 50 ± 16 |
| 1.8 | 10-10-0.5; 12-10-0.5; 13-10-0.5; 14-13-0.5; 14.5-14-3; 14-10-13; 14.5-10-40 | 60 (~32 h) | 72 ± 1 (67 ± 2) |
| 1.65 | 12-12-1; 14-12-1; 14.5-14-28; 14.5-12-30 | 60 (~48 h) | 71 ± 1 (70 ± 3) |
| 1.5 | 12-11-0.5; 14-12-0.5; 14.3-13-59; | 60 (>96 h) | 70 ± 1 (65 ± 3) |
| 1.4 | 12-9-0.5; 14-12-0.5; 14.3-11-59; 14.3-8-30; | >90 (~96 h) | 48 ± 9 (66 ± 4) |

$^a$Value in ( ) is the time required to cure at room temperature without the glow discharge curing.

As shown in Table 1, a high electric current on the order of 10–20 µA was observed. Calculations of the charge ($Q^1$) involved in electric field curing of the sol-gel were made and compared with the overall charge of the electrolyte ions in the gel-film ($Q^2$) (1″×1″ of typical thickness 10 µm, d 1.3 g/cm$^3$:

$Q^1 = 20 \times 60 \times 15 \ \mu A = 18 \ mCb$ $Q^2 = 6.25 \times 0.001 \times 1.3 \quad g \times (2.25 \times 18)/67 \times 0.01/1000$ mole/g $\times 96,500 = 4.7$ mCb The two overall charges are the same order of magnitude, yet $Q_1$ is more than three times larger. This demonstrates that the charge passed during electric field curing is not limited by the electrolyte ions contained in the film.

Additional glow discharge experiments were carried out using low water-to-siloxane ratios (1.35) and much higher molarity of acid (0.3M, as compared with the 0.01M typically used). The current observed during glow discharge curing was <0.5 µA, with curing complete within 20–30 min., indicating that water content role is a major factor in accelerating the curing and the observed current.

EXAMPLE 3

Effect of Curing Method on Film Surface Properties

Film surface properties were found to depend on the method of curing. Surfaces of polymethylsiloxane films cured at ambient conditions were hydrophobic. In contrast, films cured by the corona-discharge, such as the films shown in Example 2 (Table 3) and Example 7 (Table 6) had hydrophilic surfaces, as indicated by much lower contact angles. The hydrophilicity was most clearly observed in films prepared at super-stoichiometric recipes of MR>=1.65. There is a slight decrease in contact angle for MR<1.5 stoichiometric ratios. This may be attributed to a small degree of phase separation which was observed on top of the gel as nonhydrolyzed species produced by disproportionation reactions are expelled from the gel. This layer is methoxyl-rich and eventually undergoes slow hydrolysis and condensation to yield the more hydrophobic layer.

EXAMPLE 4

Effect of Glow Discharge Curing on Binding of Guest Molecules

Siloxane-bound chromophore model compounds carrying amino groups were prepared using chlorotrimethylsilane, Table 2. Absorbance and fluorescence were measured and used to follow the formation of the Si-chromophore bonds:

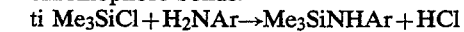
ti $Me_3SiCl + H_2NAr \rightarrow Me_3SiNHAr + HCl$

$2Me_3SiCl + H_2NAr \rightarrow (Me_3Si)_2NAr + 2HCl$ where $H_2NAr$ is p-nitroaniline. Typical spectra of PNA show a substantial red shift of both absorbance and fluorescence maxima upon binding of the amino donor-acceptor molecule to Si monomer. PMSO encaging under acid catalysis alone resulted in a blue shift of the entrapped chromophores. This shift is typical of an unreacted amino species that is associated with HCl. The spectral properties compiled in Table 2 demonstrate that a mixture of bound or protected arylamines are present in the PMSO matrix.

TABLE 2

| | Absorbance and Fluorescence Data of Free and Bound Chromophores | | | | | | | |
|---|---|---|---|---|---|---|---|---|
| Solvent | Reagent | Absorbance Maxima (nm) | | | Fluorescence Maxima (nm) | | | |
| DDS | | | | | EX. 290 nm | | | |
| CH$_3$CN | — | 204 | 260 | 294 | 394 | | | |
| " | HCl | 196 | 276 | | 404 | | | |
| " | Me$_3$SiCl | 190 | 238 wb | 294 | 394 | 413 | | |
| " | Me$_3$SiCl + 1 h | 190 | 238 wb | | | 413 | 452 | |
| " | Me$_3$SiCl + 3 h | 190 | 238 v. wb | | | 413 | | 483 |
| PMSO | ≡SiOMe 2 days | 202 | 260 | | 337 | 414 | | |
| p-nitroaniline | | | | | EX. 320 nm | | | |
| CH$_3$CN | — | 228 wb | 360–366 sb | | 377 sb | 416 sh | | 501 sh |
| " | HCl | 228 v. wb | 360–366 wb | | 377 ss | 393 ss | 412 ss | 501 sh |
| " | Me$_3$SiCl | 252 ws | 364 wb | | | | 425 | 459 |
| " | Me$_3$SiCl + 1 h | | | | | | | |
| " | Me$_3$SiCl + 3 h | | | | 381 | 403 | 422 | 448 |
| PMSO | ≡SiOMe 2 days | 192 | 222 | 364 | 380 | 415 | | 460 sh |
| | | 196 | 226 | 366 | 390 | | | 460 sh |

DDS = 4,4-diamino-diphenylsulfone
ss—strong, sharp;
sb—strong, broad;
sh—shoulder;
ws—weak, sharp;
wb—weak, broad In thermally annealed PMSO the major change in the fluorescence of the entrapped DA molecules was a spectral shift. In the first few days of annealing at 65° C., the peak shifted to the blue. After prolonged annealing (about 50 days), a small yet distinguishable red-shift was observed indicating chemical binding of the entrapped DA molecule to the matrix. The shifting of the fluorescence to the blue as well as to the red suggested a mixture of species, partly bound to the matrix to a variety of degrees and partly protonated.

The relatively large fluorescence red-shift of the donor-acceptor molecules in glow discharge cured PMSO (90 min curing at room temperature) indicated substantial chemical binding. Shifting of the fluorescence far to the red indicated a substantial number of the molecules had undergone more than one binding reaction. Enhanced binding may be attributed to the sweeping of H$^+$ ions from already formed Si-NH bonds to other sites of reaction:

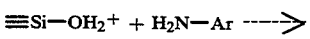

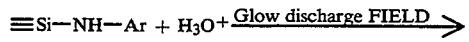

Typical recipes for preparing PMSO films loaded with amino chromophores are shown in Table 3.

EXAMPLE 5

Photophysical studies were performed on the non-binding donor-acceptor chromophore DANS (4,4-dimethylamino-stilbene) in glow discharge cured and thermally cured PMSO matrices to determine electrolyte correlation with water removal during curing.

Fluorescence of DANS Entrapped in Cured PMSO Matrices

The fluorescence spectra of DANS (4,4-dimethylamino-stilbene) entrapped in thermally cured and glow discharge cured PMSO matrices prepared from water-rich and water-like recipes were determined. The fluorescence maxima of the protonated and non-protonated DNAS species is separated by about 180 nm at 597–611 and 416–418 nm respectively. DANS in thermally cured PMSO is almost completely protonated. In the glow discharge cured and water-lean PMSO samples prepared at the same DANS-HCl molar-ratio, peaks of both protonated and free DNAS molecules are found. When water-rich recipe is glow discharge cured, a strong fluorescence peak of the free DANS was found, while in the region of the protonated species only a small shoulder remained.

EXAMPLE 6

The following examples illustrate modification of a polymer film surface by exposure to the corona field.

An organosiloxane sol is prepared by combining 1.0 g of methyltrimethoxysilane and 0.02 g of 1,8-diaminonaphthalene with 0.3 g of a 0.01M aqueous solution of hydrogen chloride and stirring for 5 min at

TABLE 3

| Typical Sol-Gel PMSO Recipes Loaded with Amino-Chromophores[a] | | | | | |
|---|---|---|---|---|---|
| Chromophore[d] | Loading[c] | Water/PMSO Molar Ratio[b] | Add. Solvent (% w/w) | Add. 1M HCl (% w/w) | Remarks |
| PNA | 35 | 2:1 | — | 4 | |
| PNA | 150 | 2:1 | CH$_3$CN; 30 | 12 | Solidifies as cast. |
| DANS | 10 | 2:1 | — | 4 | |

[a] % loading respective to the sole composition. In brackets are the loadings in the final glass.
[b] Water containing 10$^{-2}$M HCl.
[c] mg of chromophore/g silane
[d] PNA = p-nitroaniline; DANS = 4,4'-dimethylamino-stilbene 80° C. The sol is poured on a 1 inch diameter polished aluminum disk and spun at 1000 rpm for 1 min. The organosiloxane sol thin-film is cured using a corona discharge of 10 microamperes and 4000 V in approximately 25 min.

After curing, the surface of the sol-gel films had a dark luster and was electrically conducting. This surface film can be removed by light abrasion, leaving a nonconducting surface. The known ability of 1,8-diaminonaphthalene to oxidatively couple to form a conducting polymer suggested that the corona discharge field had oxidatively coupled surface 1,8-diaminonaphthalene moieties.

EXAMPLE 7

An organosiloxane sol was prepared by combining 1.5 g of methyltrimethoxysilane with 0.3 g of a 0.01M aqueous solution of hydrogen chloride and stirring for ca. 5 min at 80° C. The exact point at which the solution is cast can be determined based on the weight loss due to distillation out of volatile methanol product. The sol was poured on a 1 inch diameter polished aluminum disk and spun at 1000 rpm for 1 min. The contact angle of water on the final film can be measured. The lower the contact angle, the more hydrophilic the surface. The value of the contact angle is influenced by the $H_2O$:MTMS ratio, the period of time the film is cured by the corona, and by the weight loss at the point of curing, see Table 4. Furthermore the exact position of the film surface with respect to the corona field tip is important.

EXAMPLE 8

Examples of Corona Discharge Method to Polysiloxane Glasses

An organosiloxane sol was prepared by combining 1.5 grams of methyltrimethoxysilane with 0.3 grams of 0.01M aqueous solution of hydrogen chloride and stirring for 5 minutes at 80° C. The sol was poured on a 1 inch diameter polished aluminum disk and spun at 1000 revolutions per minute for 1 minute.

The organosiloxane sol thin-film was cured using a corona discharge of 10 microamperes and 4000 volts in approximately 25 minutes. An infrared thermocouple was used to verify that there was no increase in temperature as a result of the corona discharge. A sol prepared with the above composition required 8 hours in a 75° C. oven or in 24 hours at ambient temperature for curing without the corona discharge.

An organosiloxane sol was prepared by combining 1.5 g of phenyltrimethoxysilane with 0.2 g of 0.01M hydrogen chloride solution and stirring for 10 minutes at 85° C. The sol was poured on a 1 inch diameter polished aluminum disk and spun at 1000 revolutions per minute for 1 min.

The organosiloxane sol thin-film was cured using a corona discharge of 10 microamperes and 4000 volts in approximately 15 min. A sol prepared with the above composition cured after being placed in a 75° C. oven for 24 hours and allowed to cool below the glass transition temperature. A sol prepared with the above composition cured in approximately one week at ambient temperature.

EXAMPLE 9

Cross-Linking of Polymers by Corona Discharge

A crosslinked polymer blend was prepared by combining 0.33 g of polyacrylic acid (PAA) in 1 g of water with 0.4 g of polyallylamine.hydrochloride (PIAA) in 0.3 g of water and stirring for 15 minutes at ambient temperature. The polymer solution was poured in a 1 inch diameter polished aluminum disk and spun at 1000 revolutions per minute for 1 min.

The polymer thin-film was crosslinked using a corona discharge of 20 microamperes and 4500 volts in approximately 30 minutes. The polymer thin-film swelled without dissolving in both hot and cold water. A polymer thin-film prepared with the above composition cured at 75° C. for 24 hours also swelled without dissolving in both hot and cold water.

A crosslinked polymer blend was prepared by combining 0.3 g of polymethacrylic acid (PAA) in 1 g of ethanol with 0.1 g of polyvinylphenol (PVPh) in 0.2 g of ethanol and 0.05 g of p-toluenesulfonic acid and stirring for 15 minutes at ambient temperature. The polymer solution was poured onto a 1 in diameter polished aluminum disk and spun at 800 revolutions per minute for 1 min.

The polymer thin-film was crosslinked using a corona discharge of 8 microamperes and 4000 volts in approximately 30 min. The polymer thin-film swelled and partially dissolved in both hot and cold ethanol. A polymer thin-film prepared with the above composition and cured at 75° C. for 24 hours also swelled and partially dissolved in both hot and cold ethanol.

A cross-linked polymer blend was prepared by combining 0.3 g of polymethacrylic acid (PMA) in 1 g of N,N-dimethylformamide with 0.1 g of polyvinylphenol (PVPh) in 0.2 g of N,N-dimethylformamide and 0.05 g of p-toluenesulfonic acid and stirring for 15 min at ambient temperature. The polymer solution was poured on a 1 inch diameter polished aluminum disk and spun at 800 revolutions per min for 1 min.

The polymer thin-film was crosslinked using a corona discharge of 8 microamperes and 4000 volts in approximately 30 min. The polymer thin-film swelled and partially dissolved in both hot and cold N,N-dimethylformamide. A polymer thin-film prepared with the above composition and cured at 75°C. for 24 hours also swelled and partially dissolved in both hot and cold N,N-dimethylformamide.

A cross linked polymer blend was prepared by combining 0.3 g of polymethacrylic acid (PMA) in 1 g of N,N-dimethylformamide with 0.33 g of polyhydroxyethylmethacrylate (PHEMA) in 1 g of N,N-dimethylformamide and 0.05 g of p-toluenesulfonic acid and stirring for 15 min at ambient temperature. The polymer solution was poured on a 1 inch diameter polished aluminum disk and spun at 800 revolutions per min for 1 min.

The polymer thin-film was crosslinked using a corona discharge of 10 microamperes and 4000 volts in approximately 30 min. The polymer thin-film swelled and partially dissolved in both hot and cold N,N-dimethylformamide.

A crosslinked polymer was prepared by combining 0.33 g of polyhydroxyethylmethacrylate (PHEMA) in 1 g of dimethylsulfoxide with 0.05 g of p-toluenesulfonic acid and stirring for 15 min at ambient temperature. The polymer solution was poured onto a 1 in diameter polished aluminum disk and spun at 1000 revolutions per min for 1 min.

The polymer thin-film was crosslinked using a corona discharge of 10 microamperes and 4000 volts in approximately 30 min. The polymer thin-film swelled without dissolving in both hot and cold dimethylsulfoxide. A polymer thin-film prepared with the above composition and cured at 75° C. for 24 hours swelled and partially dissolved in both hot and cold dimethylsulfoxide.

EXAMPLE 10

Small Molecules as Cross-linking Agents for Polymer Films Under Influence of Corona Discharge A crosslinked polymer was prepared by combining 0.05 g of 1,4,5,8-naphthalenetetracarboxylic dianhydride (NTA) with 0.4 g of polyallylamine.hydrochloride (PAIA) in 0.2 g water and stirring for 30 min at ambient temperature. The polymer solution was poured on a 1 in diameter polished aluminum disk and spun at 1500 revolutions per min for 1 min.

Figure 7:
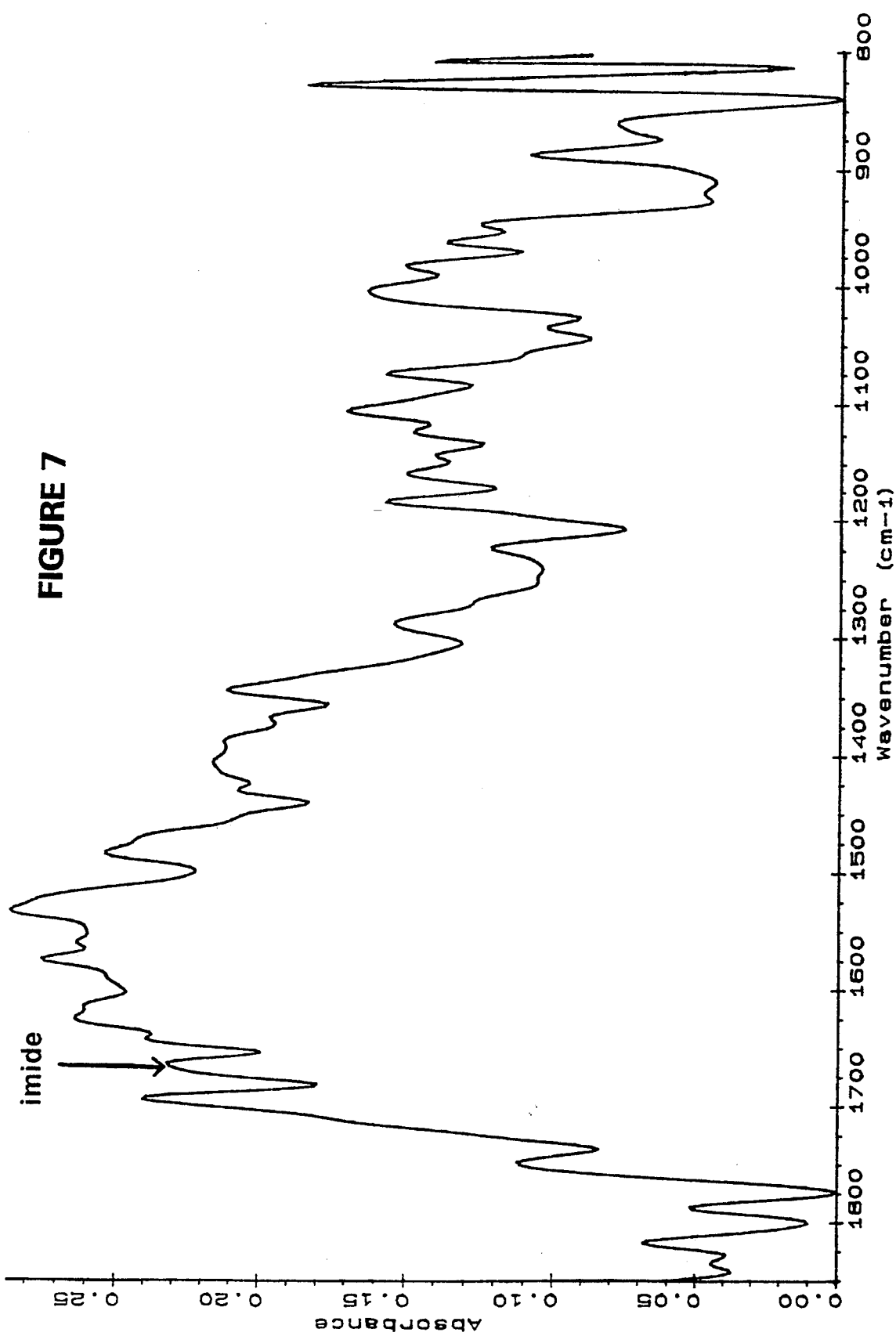
FIG. 7 is a FTIR spectrum of a polyimide thin film crosslinked using a corona discharge.

The polymer thin-film was crosslinked using a corona discharge of 40 microamperes and 6000 volts in approximately 30 min. The polymer thin-film swelled without dissolving in both hot and cold water. A polymer thin-film prepared with the above composition and cured at 75° C. for 24 hours also swelled without dissolving in both hot and cold water. Diffuse reflectance Fourier transform infrared spectroscopy revealed peaks at 1695 cm$^{-1}$ on both polymer thin-films, indicative of imide formation (FIG. 7).

A crosslinked polymer was prepared by combining 0.05 g of 4,4'-diaminodiphenyl ether (ODA) with 0.33 g of polyacrylic acid (PAA) in 1 g of water and stirring for 30 min at ambient temperature. The polymer solution was poured on a 1 in diameter polished aluminum disk and spun at 100 revolutions per min for 1 min.

The polymer thin-film was crosslinked using a corona discharge of 20 microamperes and 5000 volts in approximately 30 min. The polymer thin-film swelled without dissolving in both hot and cold water.

EXAMPLE 11

Poly(chloromethylstyrene), a polymer used for electron-beam resists, does not cross-link when subjected to corona discharge curing. This demonstrates that the reaction in the corona field is not a variant of radiation curing. Additionally, a polyamic resin that requires a high temperature to undergo a ring-closure reaction to the polyimide has been shown not to be enhanced by the corona field, which demonstrates that no local heating of the film occurs. This was also checked by direct thermal measurements of the film temperature during the corona field exposure using an infrared device.

Curing of Polyimide Thin-Films

A polyimide thin-film was prepared by pouring DuPont Pyralin PI-2545 resin onto a 1 in diameter polished aluminum disk and spun at 5000 rpm for 1 min. Two sets of polyimide thin-films each with 5 samples were prepared by this method. One set of polyamide thin-films was cured at various temperatures, ranging from ambient to 250° C. and were used as control samples. The second set of thin-films were cured using a corona discharge of 10 microamperes and 4000 volts for approximately 45 min at various temperatures similar to the first set of thin films.

The two sets of data obtained from the thin-films were compared using diffuse reflectance Fourier infrared spectroscopy. The spectra of the samples revealed no difference in the rate of ring closure of samples with regard to exposure to the corona discharge. The rate of cure of the polyimide thin-films therefore was dependent only on temperature. FIG. 7 is a FTIR spectrum comparing results in both poled and unpoled polyimide samples as a function of temperature.

TABLE 4

Curing Time and Surface Properties of Electro-Cured Sol-Gil Films

| H$_2$O/MTMS Molar Ratio[a] | Current μA[b] | Voltage kV[c] | Corona Curing-Time; min[d] | R.T. Curing-Time; hours[d] | Contact Angle av., deg. | Remarks |
|---|---|---|---|---|---|---|
| 2.5 | 10(11) | 10 | 5 | | | |
| | | | 7 | | | |
| | | | 7 | | | |
| | | | | <11 | | |
| 2.0 | 10(11) | 11 | 10 | | | |
| | | | 10 | | | |
| | | | | <48 | | |
| 1.8 | 10(11) | 11 | 15 | | 70 ± 5 | |
| | | | 15 | | 68 ± 3 | |
| | | | 20 | | 24 ± 7 | cast at −500 mg |
| | | | | <72 | 68 ± 3 | |
| 1.65 | 10(11) | 11 | 40 | | | |
| | | | 40 | | | |
| | | | | <180 | | |
| 1.5 | 10(11) | 11 | 90 | | 76 ± 3 | |
| | | | 90 | | 77 ± 3 | |
| | | | 120 | | 121 ± 21 | |
| | | | 68 | | 52 ± 8 | cast at −500 mg |
| | | | 150 | | 56 ± 6 | cast at −475 mg |
| | | | | | 35 ± 6 | - directly under the tip |
| | | | | <180 | 76 ± 5 | |
| 1.35 | 10(10) | 8 | 140 | | | |
| | 9(9) | 11.5 | 165 | | | |
| | | | | <180 | | |

[a] 10$^{-2}$M HCl in the water as catalyst. All films were cast after monitoring a 525 mg weight loss of methanol (out of a recipe of 1 g silane monomer) unless otherwise noted. Poling was carried out under N$_2$.
[b] Value in brackets: limiting current (before arcing starts)
[c] Initial value. In all current-controlled corona experiments the voltage dropped gradually to a final value about 20% lower than the initial voltage.
[d] time elapsed until the films were no longer sticky.
[e] weight loss of volatile products (primarily methanol) before spin-casting film.

However, the weight-loss of the spun-cast PI-2545 resin after room temperature corona treatment was almost the same as resulted form 250 C. thermal curing. The material appeared very similar to a fully cured film. This was a result of removal of the supporting solvent in the resin mixture and is an example of removal of volatile components at room temperature via the corona discharge method.

The present invention has been described in terms of particular embodiments found by the inventors to comprise preferred modes of practice of the invention. It will be appreciated by those of skill in the art that in light of the present disclosure numerous modifications and changes can be made in the particular embodiments exemplified without departing from the intended scope of the invention. For example, a wide variety of molecules may be incorporated into the aforedescribed films, including electrochemically active species, species of polar molecules oriented to produce nonlinear optical devices, and optical waveguides. All such modifications are intended to be included within the scope of the claims.

REFERENCES

The references listed below are incorporated herein by reference to the extent they supplement, explain, provide a background for or teach methodology, techniques and/or compositions employed herein.

Proc. Int. Workshop, "Glasses and Glass Ceramics from Gels", Gottardi, V., Ed., J. Non. Cryst. Solids, p. 48, 1982.

"Sol-Gel Technology for Thin films, Fibers, Preforms, electronics and Specialty Shapes", Klein, L. C., Ed., 1988, Noyes Publ., Park Ridge, N.J.

Reisfield, R., J. Phys. Coll. C7 Supp. 12, 1987, 48, 423.

Reisfield, R., Brusilovski, D., Eyal, M., Miron, E., Burstein, Z., Ivri, J. Chem. Phys. Let., 1989, 160,43.

Yoldas, B. E., J. Matr. Sci., 1977, 12, 1203.

Kobayashi, Y., Kurokawa, Y., Imai, Y., J. Non-Cryst. Solids, 1988, 105, 198.

Avnir, D., Kaufmann, V. R., J. Non-Cryst. solids, 1987, 92, 110.

Hara, U.S. Pat. No. 5,008,219, Apr. 16, 1991.

Hicking, A. in Modern Aspects of Electrochemistry, vol 6, O. M. Bockeris and B. E. Conway, Eds., Plenum Press, New York pp. 329-375 (1971).

Denaro, A. R., Owens, P. A., Crawshaw, A., Eur. polymer. J. 6, 487-497 (1970).

Satas, C. in plastics Finishing and Decoration, D. Satas, Ed., Van Nostrand Reinhold, Chapter 3, New York, N.Y., 1986.

Wu, S., polymer Interface and Adhesion, Marcel Dekker, New York, N.Y., 1982.

What is claimed is:

1. A method of accelerated curing of an organosiloxane sol-gel film, comprising applying a high voltage direct current electric field across the film bulk wherein said voltage is between about 4 to about 12 Kv to provide a current between about 0.5 to about 40 μamps.

2. The method of claim 1 wherein the electric field is produced by a corona discharge from a wire tip, parallel wires, or array of parallel wires.

3. The method of claim 2 wherein the electric field produced is between about 1 to about 5 cm from the surface of the film.

4. The method of claim 1 wherein the curing is at room temperature.

5. The method of claim 1 wherein the curing is at about 22° C.–25° C.

6. The method of claim 1 further comprising admixing a guest molecule with an organosiloxane polymer precurser prior to forming the polymer sol-gel film.

7. The method of claim 6 wherein the guest molecule is a dye which lases when incorporated into the polymer, said dye being selected from a group consisting of Rhodamine 6G, Pyridin-1, and Coumarin 153.

8. The method of claim 6 wherein the guest molecule is 4,4'-diaminodiphenyl sulfone, 4,4'-aminonitroazodiphenyl or 4,4'-diaminonitrostilbene.

9. The method of claim 6 wherein the guest molecule has nonlinear optical activity and is p-nitroaniline or 4,4'-dimethyl amino stilbene.

10. A method of producing a hydrophilic surface on an organosiloxane sol-gel film, comprising:
   admixing an organosiloxane polymer precursor and water to form a sol-gel wherein water to polymer ratio is between about 1.35 to about 2.5;
   casting the sol-gel after a volatile product weight loss of about 47–53% of original weight to form a sol-gel film; and
   curing said sol-gel film by the method of claim 1 wherein the electrical field voltage is between about 8 to about 11.5 kV.

11. The method of claim 10 wherein the contact angle of water on the sol-gel surface is about 24° to 121°.

12. A hydrophilic organosiloxane sol-gel film prepared by the method of claim 10.

* * * * *